United States Patent
Fortes et al.

(10) Patent No.: US 8,231,081 B2
(45) Date of Patent: Jul. 31, 2012

(54) ELECTRONIC DISPLAY MOUNT

(75) Inventors: Hugo L. Fortes, Miami, FL (US);
Armand Wong, Miami, FL (US);
Robert Alfonso, Miami, FL (US); Alex Rodrigo, Miami, FL (US); Raul Segredo, Coral Gables, FL (US); Stylian Cocalides, Miami, FL (US)

(73) Assignee: Avionics Support Group, Inc., Miami, FL (US)

( * ) Notice: Subject to any disclaimer, the term of this patent is extended or adjusted under 35 U.S.C. 154(b) by 207 days.

(21) Appl. No.: 12/748,421

(22) Filed: Mar. 28, 2010

(65) Prior Publication Data

US 2011/0031373 A1    Feb. 10, 2011

Related U.S. Application Data

(63) Continuation-in-part of application No. 11/336,270, filed on Jan. 20, 2006, now Pat. No. 7,686,250.

(51) Int. Cl.
*B64C 1/00* (2006.01)
(52) U.S. Cl. ........ 244/129.1; 244/1 R; 211/97; 211/115; 211/131.1; 348/827; 361/679.06; 361/679.07
(58) Field of Classification Search ............. 244/1 R, 244/129.1; 211/115, 116, 131.1, 97, 98; 348/827; 361/679.06, 679.07
See application file for complete search history.

(56) References Cited

U.S. PATENT DOCUMENTS

| 7,028,961 | B1 | 4/2006 | Dittmer |
| 7,571,883 | B2 | 8/2009 | Van Groesen |
| 7,621,500 | B2 * | 11/2009 | Ishizaki et al. ................ 248/371 |
| 7,950,613 | B2 * | 5/2011 | Anderson et al. .......... 248/282.1 |
| 8,074,948 | B2 * | 12/2011 | Zou et al. ...................... 248/157 |

OTHER PUBLICATIONS

VersaTrue Mounting System: www.versatrue.com Dec. 7, 2004.

* cited by examiner

*Primary Examiner* — J. Woodrow Eldred
(74) *Attorney, Agent, or Firm* — FSB FisherBroyles, LLP; Anthony J. DoVale

(57) ABSTRACT

The invention is a mount for an electronic display device. The mount comprises a mount member that has a top face and a bottom face. Portions of the mount member are configured to engage portions of a mounting surface within the cockpit of an airplane. The mount also comprises a containment member spaced therefrom the mount member. A joint member is disposed in frictional contact with portions of the respective mount member and containment member. A base member, which can be configured for engagement with a portion of the electronic display device, can be connected to the joint member.

25 Claims, 8 Drawing Sheets

ELECTRONIC DISPLAY MOUNT

This application claims the benefit of and is a continuation-in-part of U.S. application Ser. No. 11/336,270, filed on Jan. 20, 2006, which is herein incorporated by reference in its entirety.

FIELD OF THE INVENTION

Presented herein is an electronic display mount. More specifically, a display mount for electronic devices primarily used within the cockpit of an airplane.

BACKGROUND OF THE INVENTION

In the aviation industry, there are many advances in navigation and communication that require the use of portable electronic devices. One such device is an electronic flight bag (EFB). The concept of EFB's is a method of eliminating the voluminous Jeppeson style paper charts and approach plates in an aircraft. EFB's offer display means for flight navigation charts which are portable and can be electronically updated by the installation of pre-prepared electronic maps. They typically offer small screen display approximately the size of a Jeppesen approach plate (about 5"×8").

The value of such a device is immense, however, space in a cockpit is very limited. To date, it has been difficult to locate a position to which to affix the EFB, which is both readily viewed by the pilot and does not interfere with the flight controls, but also permits positioning of the EFB. What is needed is a mount with which to affix the EFB to various locations in the cockpit.

SUMMARY

Presented herein is a mount for an electronic display device. The mount comprises a mount member that has a top face and a bottom face. In some aspects, portions of the mount member are configured to engage portions of a mounting surface within the cockpit of an airplane. The mount can also comprise a containment member spaced therefrom the mount member and defining an opening therethrough. In one aspect, there is plurality of attachment members therebetween the top face of the mount member and the bottom side of the containment member, defining a cavity between the mount member, the containment member, and the attachment members.

In one exemplary aspect, a joint member is disposed in the cavity formed by the mount member, the containment member and the attachment members. In one aspect, there is an elongate articulating member extending outwardly away from the outer surface of the joint member and through the opening defined through the containment member. Rotation of the joint member causes the articulating member to articulate within the opening. In one aspect, there can be a base member disposed on a distal portion of the elongate articulating member. The base member can be configured for engagement with a portion of the electronic display device in order to secure the electronic display device to the articulating member.

BRIEF DESCRIPTION OF THE DRAWINGS

These and other features of the preferred embodiments of the present invention will become more apparent in the detailed description in which reference is made to the appended drawings wherein.

DETAILED DESCRIPTION OF THE INVENTION

Figure 1:
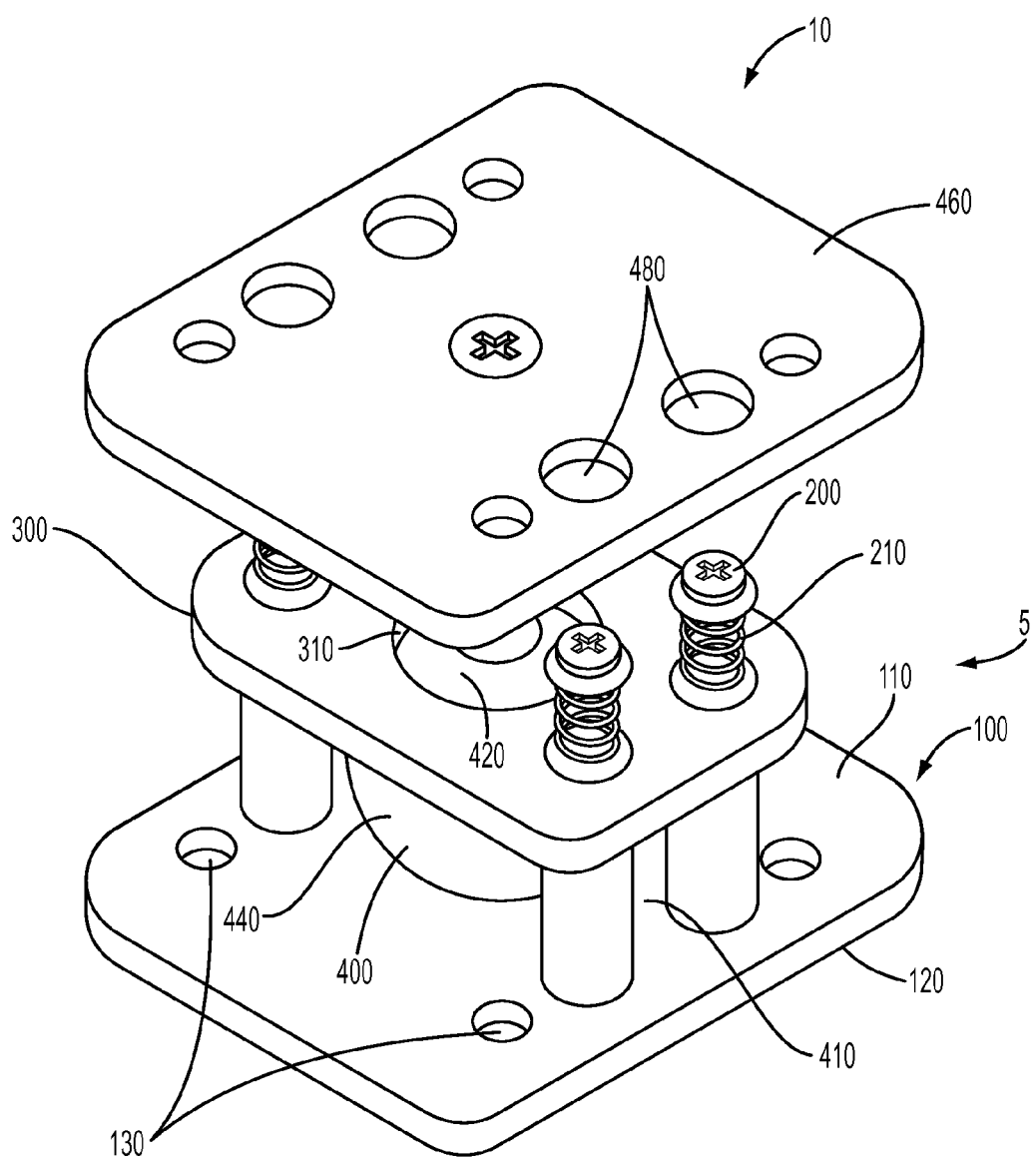
FIG. 1 is a perspective view of one aspect of the mount for an electronic display device of the present invention.
Figure 2:
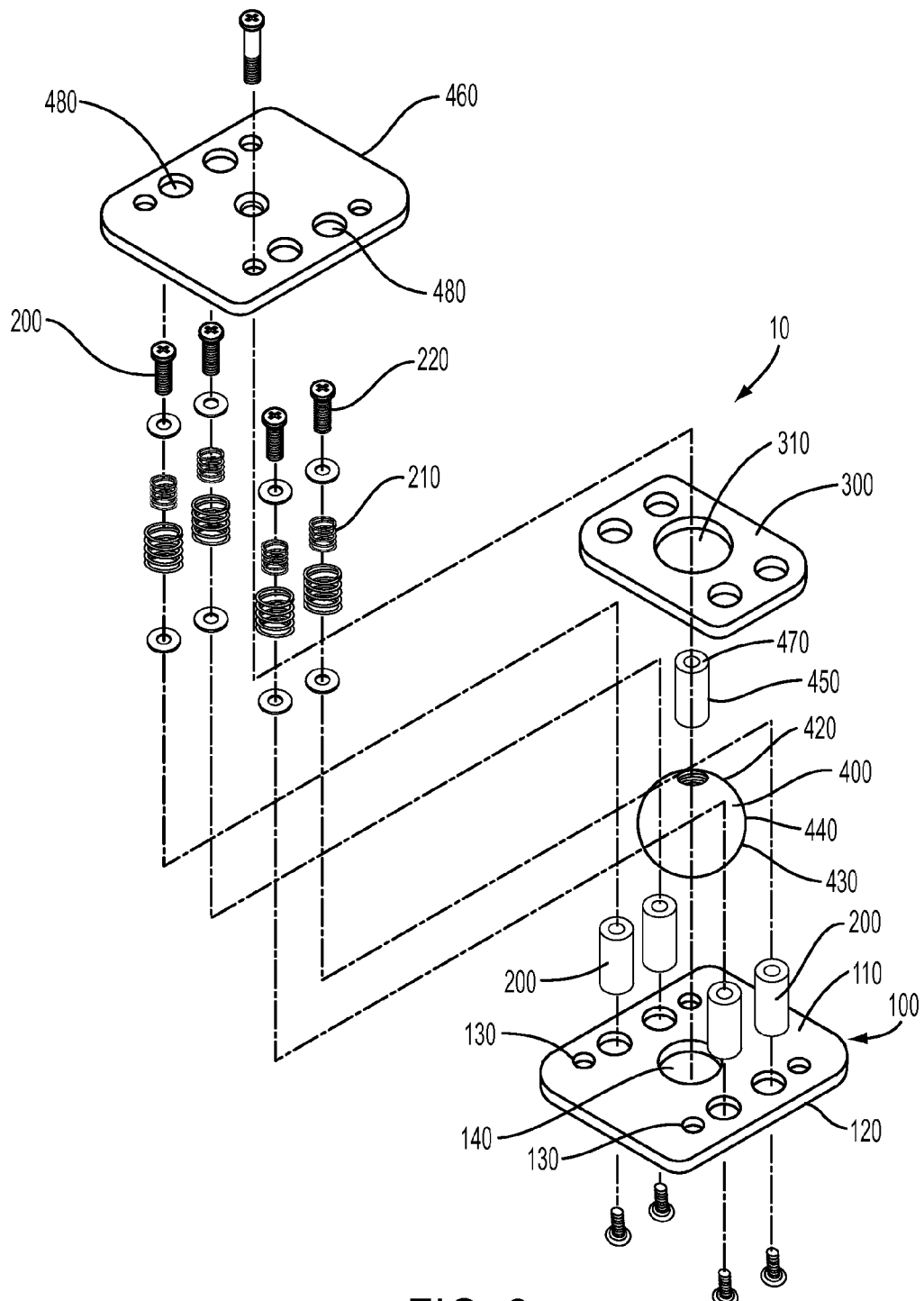
FIG. 2 is an exploded perspective view of the mount of FIG. 1.
Figure 3:
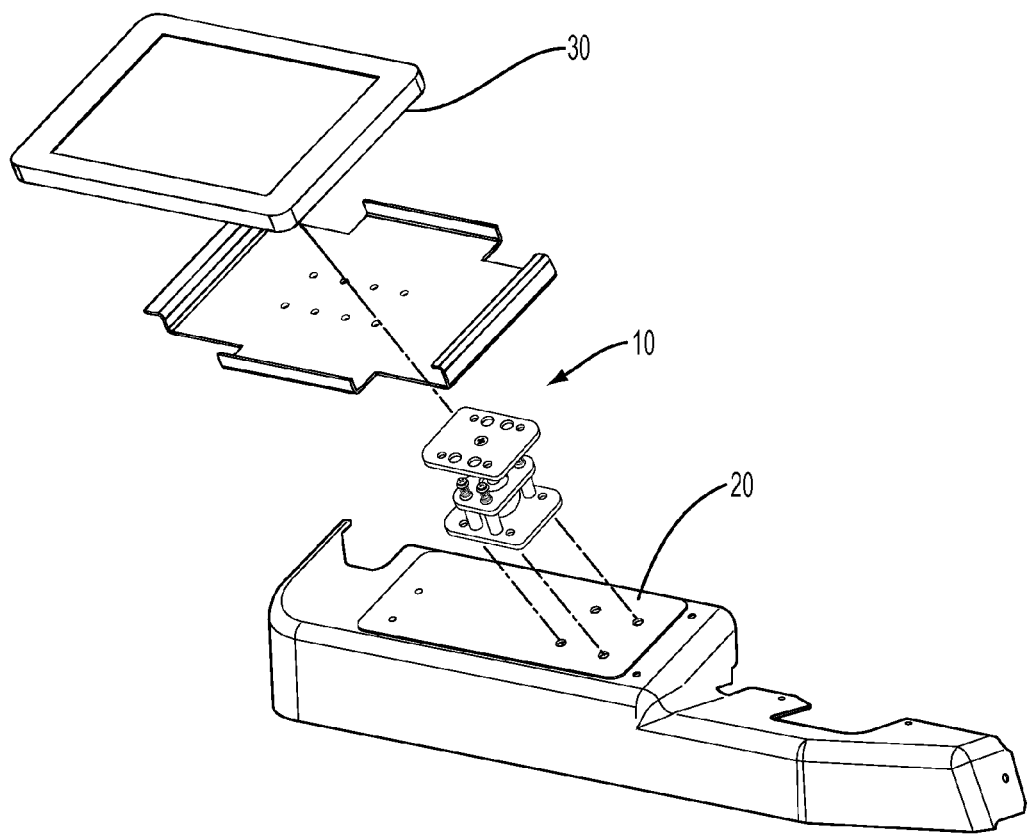
FIG. 3 is a perspective view of the mount of FIG. 1, showing a mounting surface, a base member, and an electronic display device.
Figure 4:
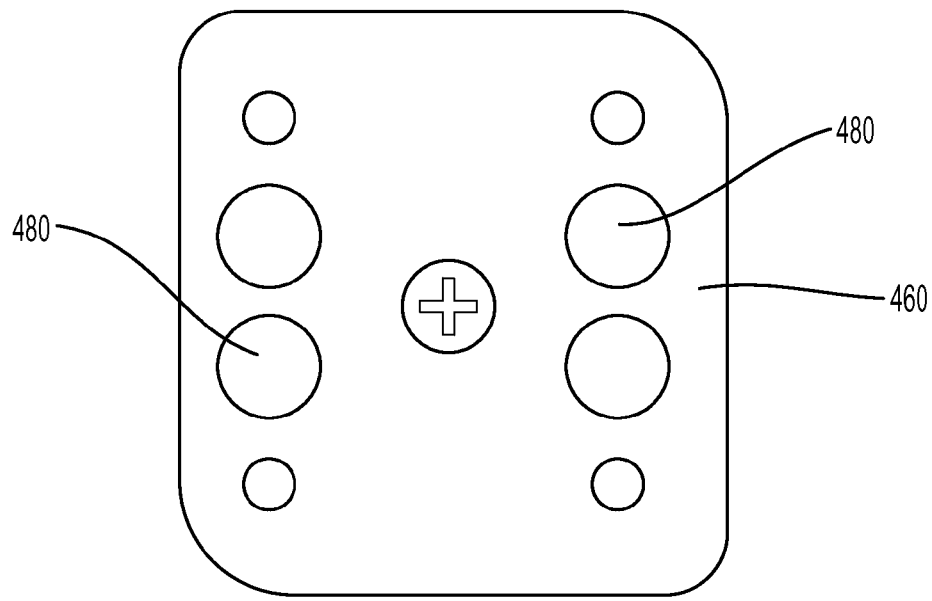
FIG. 4 is a top elevational view of the mount of FIG. 1 showing the base member with a plurality of adjustment bores.

The present systems and apparatuses are more particularly described in the following exemplary embodiments that are intended as illustrative only since numerous modifications and variations therein will be apparent to those skilled in the art. As used herein, "a," "an," or "the" can mean one or more, depending upon the context in which it is used. The preferred embodiments are now described with reference to the figures, in which like reference characters indicate like parts throughout the several views.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

Presented herein is a mount 10 for an electronic display device 30. In one aspect, the mount 10 comprises a support member 5 configured to engage portions of a moveable window frame of an aircraft cockpit. The support member 5 is connected to a base member 460, which is configured to engage portions of an electronic display device 30. The base member, in this aspect, is adjustable such that the viewing angle of the electronic display device can be selectively adjusted. In another aspect, the electronic display device is an electronic flight bag.

In one aspect, the support member 5 comprises a mount member 100 that has a top face 110 and a bottom face 120. Portions of the mount member 100 are configured to engage portions of a mounting surface 20 within the cockpit of an airplane. The mounting surface 20 can be, but is not limited to, portions of the pilot's moveable window frame. In one aspect, the mount member comprises holes 130 extending therethrough for one or more fasteners to attach the mount member to the mounting surface. As one skilled in the art can appreciate, the mount member can be affixed to the mounting surface in any number of ways, including but not limited to screwing, bolting, adhering, and the like. In one aspect, the mount member 100 is substantially planar. In another aspect, the bottom face is configured to conform to the mounting surface 20.

The mount 10 also comprises a containment member 300 spaced therefrom the mount member and defining an opening 310 therethrough. In one aspect, the containment member 300 is substantially planar. The mount further comprises a plurality of attachment members 200 extending therebetween the top face 110 of the mount member and the bottom side of the containment member. In one aspect, a cavity 410 is defined between the respective mount member, containment member, and attachment members 200.

As depicted in FIG. 1, a joint member 400 is disposed in the cavity 410 formed by the respective mount member 100, containment member 300 and attachment members. In one aspect, the joint member is substantially spherical. However, other shapes for the joint member are contemplated.

For example, in one aspect, at least a part of the top portion 420 and the bottom portion 430 of the joint member 400 has a curved surface. In another aspect, the mount member has a depression 140 in its top face 110 configured to complimentarily accept a bottom portion 430 of the joint member. As one skilled in the art will appreciate, the depression can be a hole therethrough the mount member. In this aspect, at least a portion of the bottom portion of the joint member is disposed therein the depression 140. Further, in one aspect, at least a portion of the top portion 420 of the joint member 400 can engage a portion of the opening 310 therein the containment member. In this aspect, the top and bottom portions of the joint member are adapted to frictionally engage the depression of the mount member and top portion of the opening to selectively restrict the rotational movement of the joint member.

Figure 5:
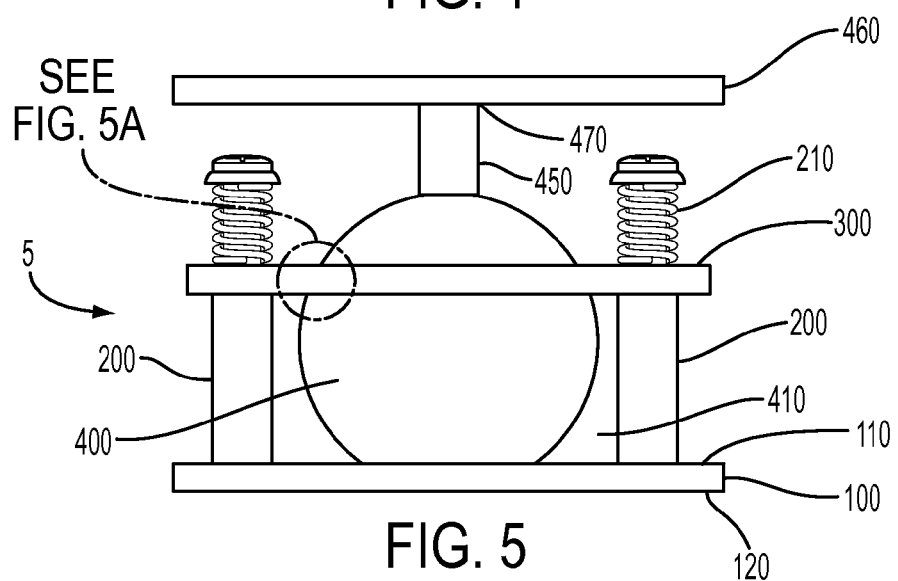
FIG. 5 is a side elevational view of the mount of FIG. 1.
Figure 5A:
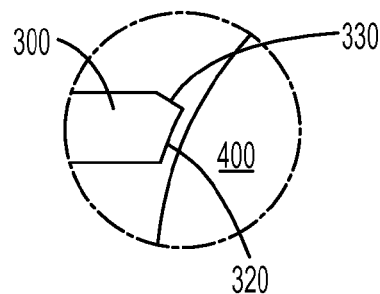
FIG. 5A is a sectional view of a portion of the mount of FIG. 5, showing the lower and upper circumferential edges of the containment member that are partially beveled.

FIG. 5 shows an elongate articulating member 450 extending outwardly away from the outer surface 440 of the joint member 400 and through the opening defined through the containment member. One will appreciate that rotation of the joint member causes the articulating member 450 to articulate within the opening 310. In one aspect, the mount further comprises a base member 460 disposed on a distal portion 470 of the elongate articulating member. The articulating member also acts to space the base member from the joint member. In one aspect, the articulating member is a cylindrical spacer configured to permit a hex screw, or similar fastener, to pass therethrough, connecting the base member to the joint member 400 via the articulating member. The base member 460 can be configured for engagement with a portion of the electronic display device 30 in order to selectively secure the electronic display device to the articulating member. In another aspect, the base member defines a plurality of adjustment bores 480 adapted to allow access to the attachment members.

Figure 9:
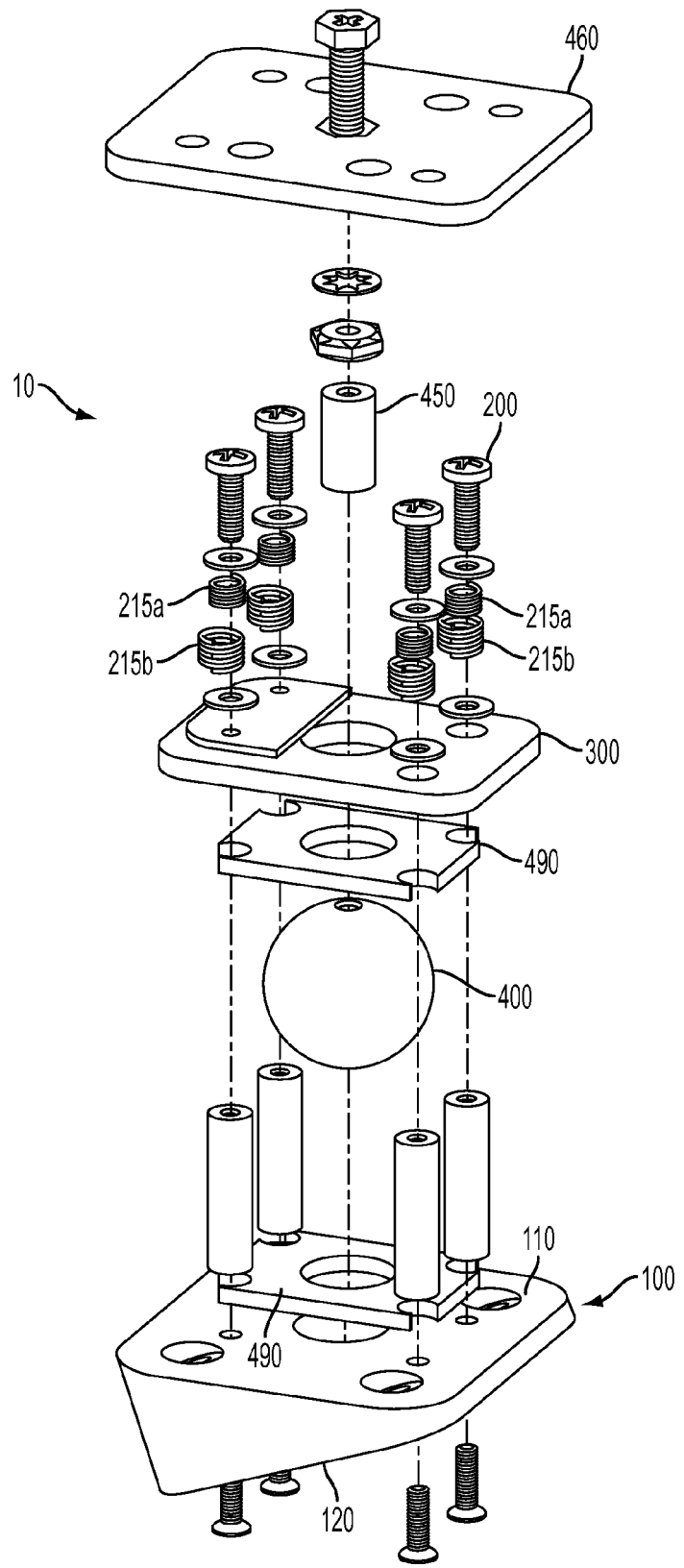
FIG. 9 is an exploded perspective view of the mount of FIG. 8.

In an effort to increase the frictional surface contact between the containment member and the joint member, in one aspect, the opening 310 therein the containment member 300 comprises a lower circumferential edge that is at least partially beveled or shaped to conform to the exterior shape of the top portion of the joint member. Similarly, to increase the range of motion of the articulating member, in another aspect, the opening in the containment member can comprise an upper circumferential edge that is at least partially beveled. In another aspect, the containment member and/or the mount member can comprise a friction plate 490 between the respective surface of the containment member and/or the mount member. In such aspects, the friction plate 490, as shown in FIG. 9, is referred to as being part of the respective containment member and/or the mount member.

In one aspect, in an operative position, the attachment members 200 are configured to selectively compress portions of the containment member and portions of the mount member against the joint member such that the containment member and the mount member 100 cause a friction fit with the joint member 400, substantially restricting it from rotating (as well as the articulating member 450 and anything that can be attached thereto). The attachment members can be, for example, screws, bolts, and the like. Therefore, as one skilled in the art will appreciate, tightening or loosening of the attachment members selectively increases or decreases the force of the friction fit and, therefore, increases or decreases the external force required to overcome the selective friction fit. As one skilled in the art will appreciate, any conventional method of compressing the containment member 300 and mount member on the joint member can achieve the same result. For instance, a clamp could be used between the containment member and the mount member.

In one aspect, the invention comprises a plurality of bias elements 210 disposed on the attachment members 200, supported by a portion of the containment member. The bias elements 210 are meant to adjust the force applied on the containment member by the attachment members. As the force is decreased, containment member 300 is biased between the engaged position and an unengaged position, in which the friction fit of the joint member between the containment member and the mount member is released, enabling limited rotation of the joint member and, therefore, movement of the articulating member within the opening in the containment member. The bias elements can be, for example, springs. The bias members can also comprise two or more concentric springs, using an inner spring 215a and an outer spring 215b, as shown in FIG. 9.

Figure 6:
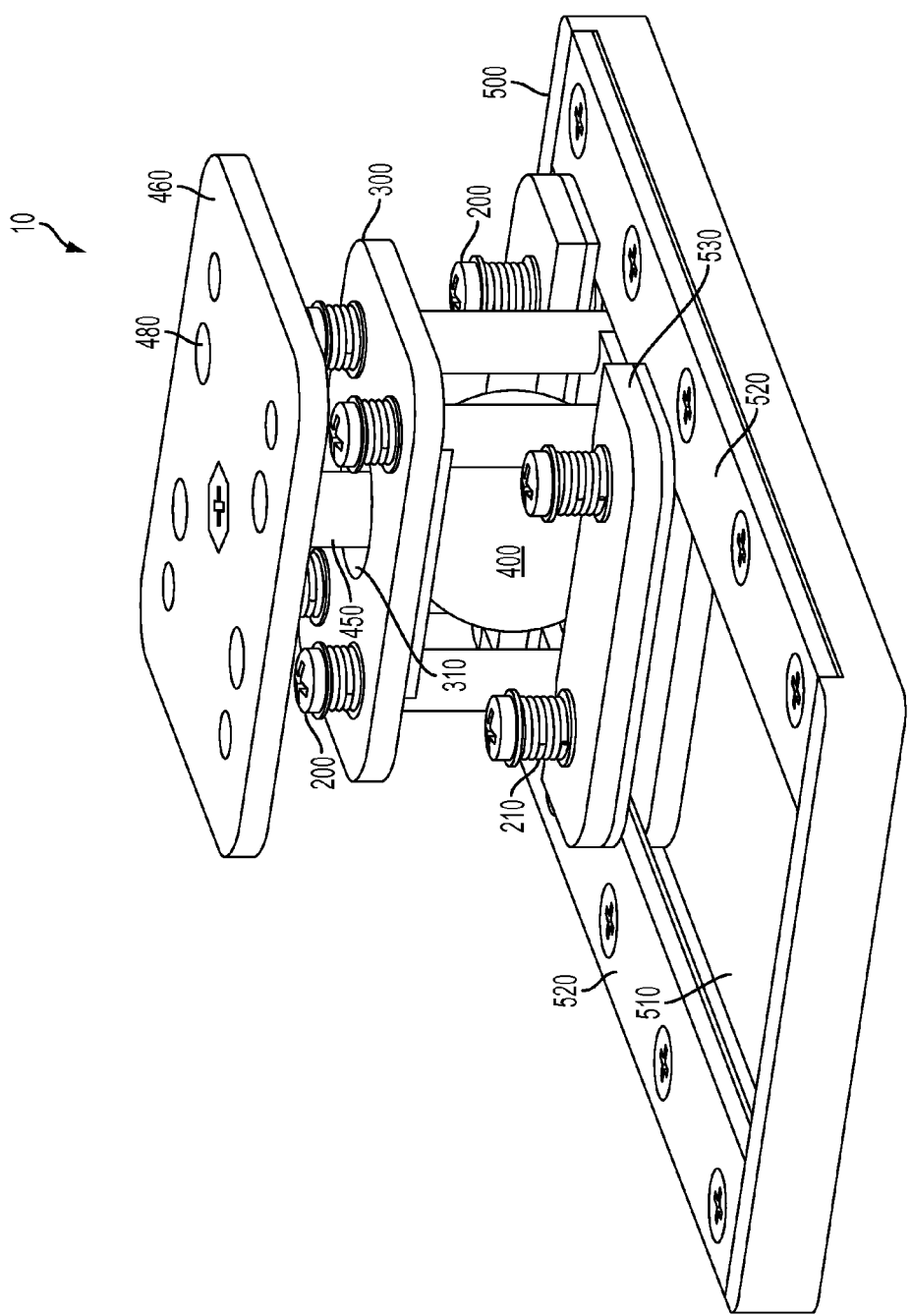
FIG. 6 is a perspective view of one aspect of a mount for an electronic device, showing the mount member engaged with a mounting plate.
Figure 7:
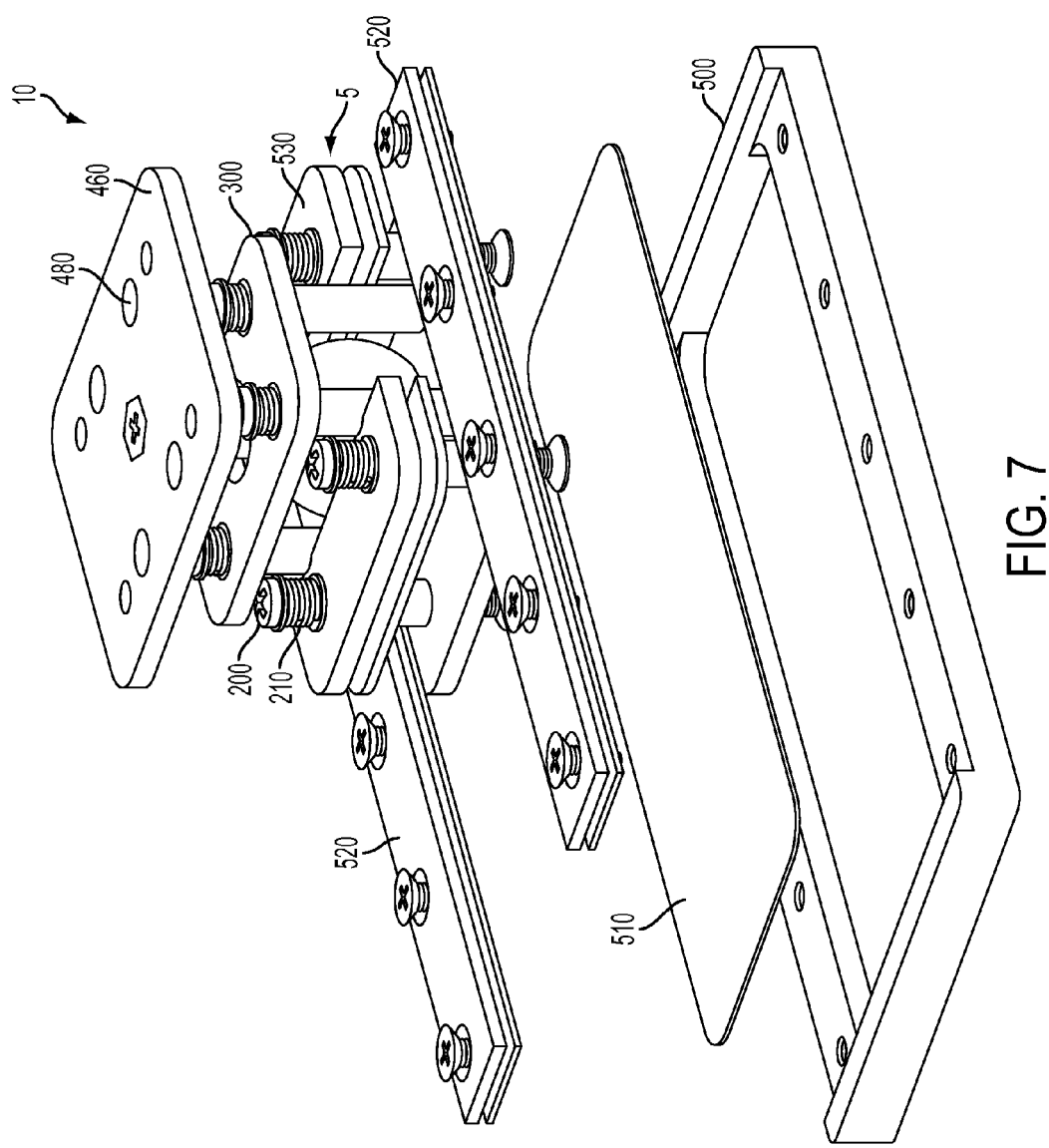
FIG. 7 is an exploded perspective view of the mount of FIG. 6.

In another exemplary and alternate embodiment, the support member described herein above is configured to engage a mounting plate 500. The mounting plate 500, in turn, in this aspect, is configured to engage portions of the moveable window frame. This alternative embodiment permits translation of the support member 5 for repositioning it along the window frame. Referring to FIG. 6, the support member is configured to selectively engage a portion of the mounting plate on or substantially adjacent the top face 510 of the mounting plate. The support member is also configured to selectively release the mounting plate, enabling repositioning of the support member 5 along the longitudinal axis $A_L$ of the top face 510 of the mounting plate 500.

In one aspect, the mounting plate 500 comprises a pair of elongate rails 520 positioned at least adjacent a portion of the top face 510 of the mounting plate substantially parallel to its longitudinal axis. At least a portion of at least one rail overlies a portion of the support member to couple the support member to the mounting plate. The rails 520, in one aspect, overly portions mount member, retaining the mount member 100 substantially between portions of the rails and the top face of the mounting plate 500.

As illustrated in FIG. 6, the mount 10 is equipped to selectively engage at least one of the rails 520, and in some cases, both rails to restrict movement of the support member relative to the top face of the mounting plate along its longitudinal axis. In one aspect, the mount member 100 defines a plurality of apertures through which one or more attachment members 200 can be inserted or otherwise protrude therefrom away from the top face 510 of the mounting plate. As such, the mount can further comprise a retention plate 530 coupled to the attachment members 200, as shown in FIG. 6. In one aspect, a plurality of bias elements 210 can be disposed on the attachment members 200, supported by a portion of the retention plate. The bias elements 210 are meant to adjust the force applied on the elongate rails 520 by the retention plate 530. As the force is increased, the frictional force between the retention plate, the elongate rails, and the mount member, increases, thereby fixedly positioning the support member in a desired location along the longitudinal axis of the top face of the mounting plate. Conversely, as the force is decreased, the frictional force between the retention plate, the elongate rails, and the mount member, decreases, thereby permitting limited movement of the support member along the longitudinal axis of the top face of the mounting plate.

Figure 8:
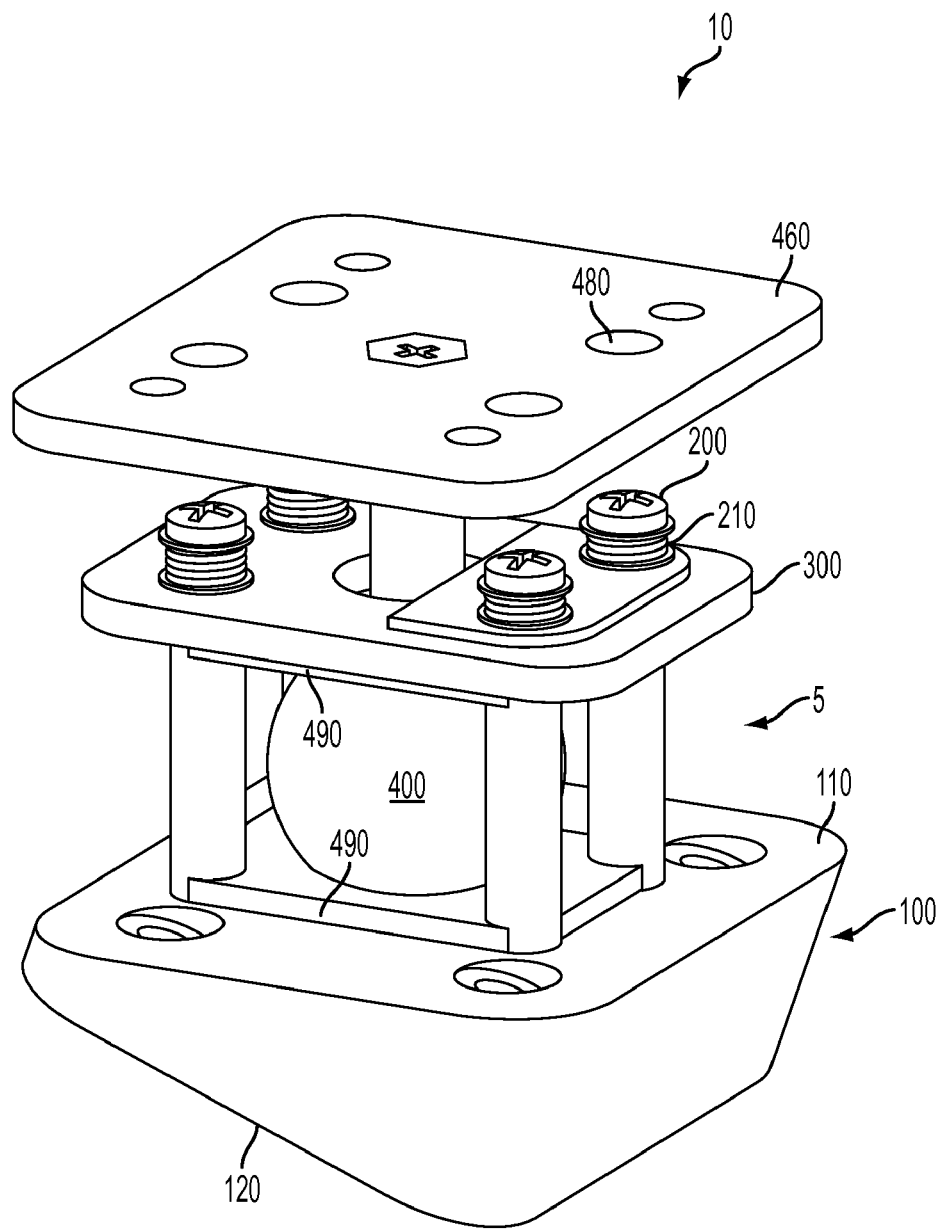
FIG. 8 is a perspective view of one aspect of a mount for an electronic device, showing a wedge-shaped mount member.

In an alternate, exemplary aspect, as shown in FIG. 8, where the support member 5 configured to engage portions of a moveable window frame of an aircraft cockpit, at least portions of the top face 110 of the mount member 100 can be angled relative to the bottom face 120 of the mount member. This configuration provides additional flexibility in terms of orienting the EFB with respect to the viewer. The mount member 100 can be, for instance, substantially wedge shaped. It can be appreciated, that one skilled in the art can choose an angle for desired viewing orientation.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

We claim:

1. A mount for an electronic display device, comprising:
   a mounting plate configured to engage portions of a moveable window frame of an aircraft cockpit, the mounting plate having a top face and a longitudinal axis;
   a support member configured to selectively engage a portion of the mounting plate on or substantially adjacent the top face of the mounting plate, and to selectively release the mounting plate, enabling repositioning of the support member along the longitudinal axis of the top face of the mounting plate;
   a base member connected to a portion of the support member, wherein the base member is configured to engage portions of an electronic display device; and
   means for orienting the base member with respect to the support member such that the electronic display device is at a desired orientation with respect to an external viewer.

2. The mount of claim 1, wherein the support member further comprises:
   a mount member having a top face and a bottom face, wherein portions of the mount member are configured to engage portions of the mounting plate;
   a containment member spaced therefrom the mount member, the containment member having a top side and a bottom side and defining an opening therethrough;
   a plurality of attachment members therebetween the top face of the mount member and the bottom side of the containment member, wherein the mount member, the containment member, and the plurality of attachment members define a cavity;
   a joint member disposed therein the cavity, the joint member having an outer surface;
   an elongate articulating member extending therefrom the outer surface of the joint member such that at least a portion of the elongate articulating member extends therethrough the opening defined therethrough the containment member, wherein rotation of the joint member articulates the articulating member within the opening; and
   a means for selectively compressing and releasing the joint member between portions of the containment member and portions of the mount member to selectively cause a friction fit between the joint member and portions of the containment and mount members such that the elongate articulating member is substantially restricted from moving;
   wherein the base member is disposed thereon a distal portion of the elongate articulating member.

3. The mount of claim 2, wherein the mount member is substantially planar.

4. The mount of claim 2 wherein the containment member is substantially planar.

5. The mount of claim 2, wherein the joint member is substantially spherical.

6. The mount of claim 2, further comprising a depression therein the top face of the mount member configured to accept portions of the joint member.

7. The mount of claim 6, wherein a portion of the joint member is disposed therein the depression and wherein a portion of the joint member is engaged with the opening therein the containment member, thereby restricting the lateral movement of the joint member.

8. The mount of claim 2, wherein the opening therein the containment member comprises a lower circumferential edge that is at least partially beveled to partially conform to the exterior shape of the joint member.

9. The mount of claim 2, wherein the opening therein the containment member comprises an upper circumferential edge that is at least partially beveled.

10. The mount of claim 2, wherein the joint member is substantially confined by the mount member, the containment member, and the attachment members, thereby restricting the lateral movement of the joint member.

11. The mount of claim 1, wherein the electronic display device is an electronic flight bag.

12. The mount of claim 1, further comprising:
    a pair of elongate rails positioned at least adjacent a portion of the top face of the mounting plate substantially parallel to the longitudinal axis, wherein at least a portion of at least one rail overlies a portion of the support member to couple the support member to the mounting plate.

13. The mount of claim 12, wherein the support member further comprises means for selectively engaging at least one of the elongate rails of the pair of elongate rails to restrict movement of the support member relative to the top face of the mounting plate along its longitudinal axis.

14. The mount of claim 13, wherein the support member further comprises means for selectively releasing the at least on elongate rails of the pair of elongate rails to enable movement of the support member relative to the top face of the mounting plate along its longitudinal axis.

15. A mount for an electronic display device, comprising:
    a support member configured to engage portions of a moveable window frame of an aircraft cockpit, the support member comprising a mount member having a bottom face and an opposed top face, wherein portions of the mount member are configured to engage portions of the moveable window frame and wherein the top face of the mount member is angled relative to the bottom face of the mount member;

a base member connected to a portion of the support member, wherein the base member is configured to engage portions of an electronic display device; and means for orienting the base member with respect to the support member such that the electronic display device is at a desired orientation with respect to an external viewer.

16. The mount of claim 15, wherein the support member further comprises:

a containment member spaced therefrom the mount member, the containment member having a top side and a bottom side and defining an opening therethrough;

a plurality of attachment members therebetween the top face of the mount member and the bottom side of the containment member, wherein the mount member, the containment member, and the plurality of attachment members define a cavity;

a joint member disposed therein the cavity, the joint member having an outer surface;

an elongate articulating member extending therefrom the outer surface of the joint member such that at least a portion of the elongate articulating member extends therethrough the opening defined therethrough the containment member, wherein rotation of the joint member articulates the articulating member within the opening; and a means for selectively compressing and releasing the joint member between portions of the containment member and portions of the mount member to selectively cause a friction fit between the joint member and portions of the containment and mount members such that the elongate articulating member is substantially restricted from moving;

wherein the base member is disposed thereon a distal portion of the elongate articulating member.

17. The mount of claim 16, wherein the mount member is substantially wedge shaped.

18. The mount of claim 16 wherein the containment member is substantially planar.

19. The mount of claim 16, wherein the joint member is substantially spherical.

20. The mount of claim 16, further comprising a depression therein the top face of the mount member configured to accept portions of the joint member.

21. The mount of claim 20, wherein a portion of the joint member is disposed therein the depression and wherein a portion of the joint member is engaged with the opening therein the containment member, thereby restricting the lateral movement of the joint member.

22. The mount of claim 16, wherein the opening therein the containment member comprises a lower circumferential edge that is at least partially beveled to partially conform to the exterior shape of the joint member.

23. The mount of claim 16, wherein the opening therein the containment member comprises an upper circumferential edge that is at least partially beveled.

24. The mount of claim 16, wherein the joint member is substantially confined by the mount member, the containment member, and the attachment members, thereby restricting the lateral movement of the joint member.

25. The mount of claim 15, wherein the electronic display device is an electronic flight bag.

\* \* \* \* \*